F. H. PATTON.
AERIAL TORPEDO.
APPLICATION FILED JUNE 22, 1917.
1,241,545.
Patented Oct. 2, 1917.
2 SHEETS—SHEET 2.
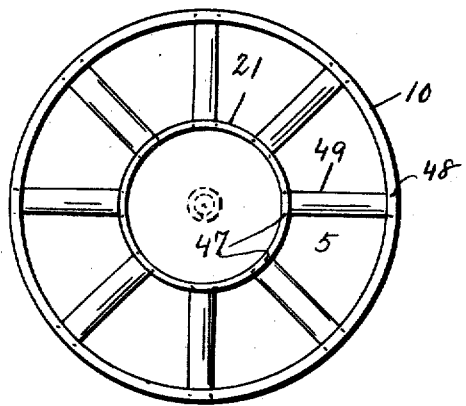
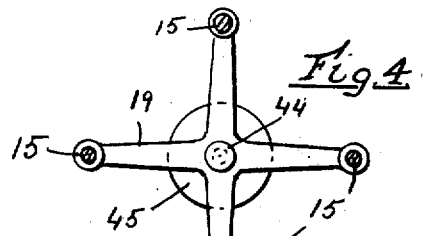
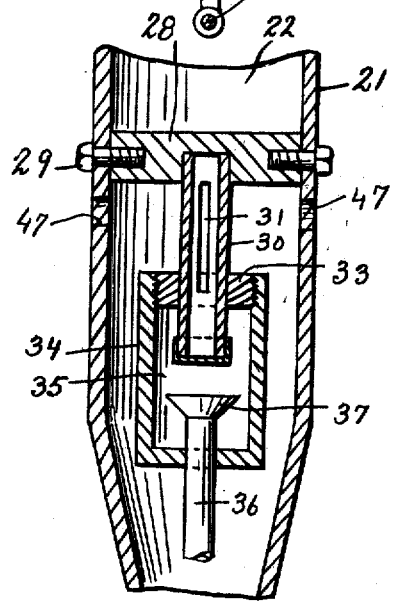
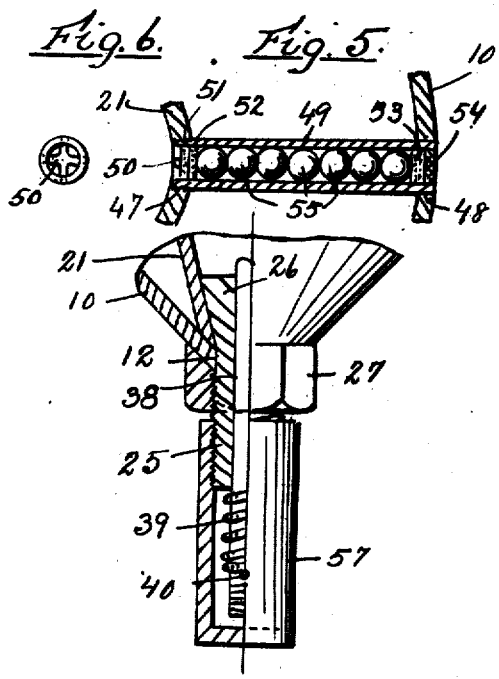
INVENTOR
FRANK H. PATTON
by Martell + Co
ATTORNEYS.

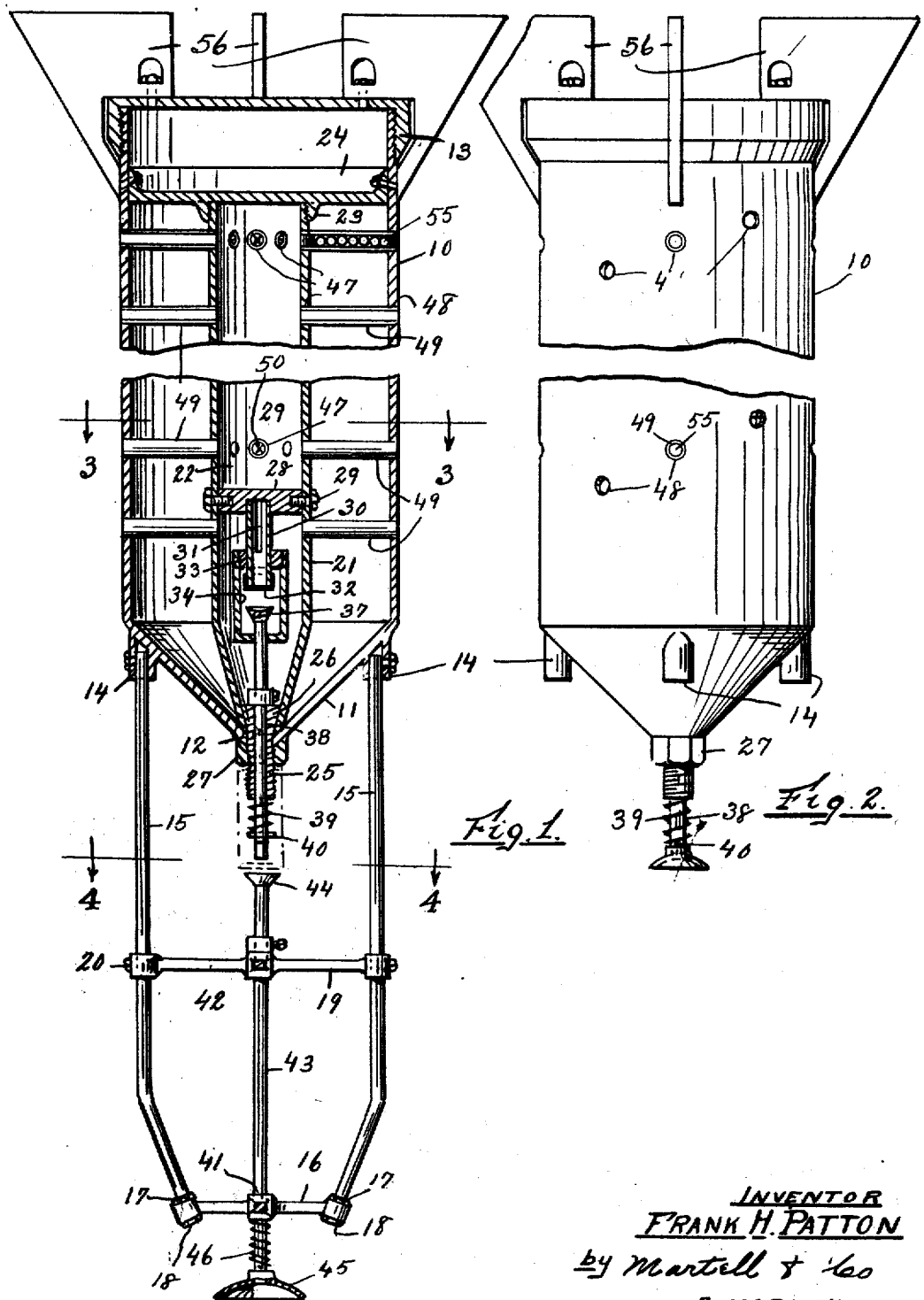

UNITED STATES PATENT OFFICE.

FRANK H. PATTON, OF FLAGSTAFF, ARIZONA.

AERIAL TORPEDO.

1,241,545.  Specification of Letters Patent.  Patented Oct. 2, 1917.

Application filed June 22, 1917. Serial No. 176,262.

*To all whom it may concern:*

Be it known that I, FRANK H. PATTON, a citizen of the United States, residing at the city of Flagstaff, in the county of Coconino and State of Arizona, have invented certain new and useful Improvements in Aerial Torpedoes, of which the following is a specification.

My invention relates primarily to a torpedo for the use of aeroplanes and the like and the object thereof is to provide a device for this purpose which will be cheap and simple in construction, accurate and positive in operation and which can be easily and quickly launched from an airship without disturbing the stability thereof.

Another object is to provide a device of this character which can be partially knocked down for transportation and which can be easily and quickly put together for use.

A further object is to provide a torpedo for use with aeroplanes which can be adapted for use either on land or water without materially altering the same.

A still further object is to provide means for preventing the premature explosion of the device while being transported and means whereby the torpedo may be fired at varying distances above the ground or water as desired.

Other objects and advantages will appear hereinafter and while I have shown and will describe my preferred form of my invention it will be understood that I do not limit myself to such form as various changes and adaptations may be made therein without departing from the spirit of my invention.

Referring to the drawings:

Figure 1, is a central longitudinal section of my torpedo ready for firing arranged to fire at a distance above the ground.

Fig. 2, is a side elevation of Fig. 1, but arranged to fire close to the ground or water.

Fig. 3, is a section on the line 3—3 of Fig. 1.

Fig. 4, is a section on the line 4—4 of Fig. 1.

Figs. 5 and 6 are details of the ammunition tubes, on an enlarged scale.

Fig. 7, is an enlarged detail, partly in section and partly in elevation, showing the manner of attaching the safety tube, or cap.

Fig. 8, is an enlarged sectional detail of the firing devices.

My device comprises a cylindrical casing 10, provided with a lower inwardly tapering end 11 in the center of which is a port or opening 12. The upper end of casing 10 is closed by a cap 13 screw threaded thereon. Upon the outer surface of the tapered end of casing 10, projecting downwardly therefrom, and equally spaced apart are sockets 14, four in number, although any number may be used, in which sockets are detachably mounted the upper ends of extension rods 15, which rods extend downwardly and are bent inwardly near their lower ends and are screw threaded at their lower ends. A spider 16 is mounted upon the lower ends of rods 15 and is held positioned by lock nuts 17 and 18. A similar spider 19 is also mounted on rods 15 intermediate the ends thereof and is held positioned by bolts 20 or other means. Mounted centrally within casing 10 to extend longitudinally thereof and concentric therewith is an inner casing 21 forming a powder chamber 22.

The upper end of casing 21 is closed by a cap 23, in screw-threaded engagement therewith, which cap is provided with an annular flange 24 secured by bolts or other means to casing 10. The lower end of casing 21 tapers inwardly and downwardly and has an opening therein adapted to register with opening 12 in casing 10. A bushing 25 having a tapered head 26 is mounted in the lower end of casing 21 and projects downwardly through the openings in casings 10 and 21 and has a nut 27 screwed thereon which bushing and nut serve to securely fasten the lower ends of said casings together and to make a tight joint therebetween. Mounted within inner casing 21, and extending from side to side thereof is a bar 28, held positioned by bolts 29 extending through the wall of casing 21, and extending downwardly from the center of this bar is a tube 30 open at its lower end and having a slot 31 cut in the side wall thereof for the admission of powder or other charge. The percussion cap 32 is mounted upon the lower open end of tube 30 in the usual manner. Tube 30 is provided intermediate its ends with an external collar 33 and a casing 34 surrounds the lower end of tube 30 and has its upper end in screw-threaded engagement with said collar and forms a firing chamber 35.

A firing pin 36 having a tapered head 37 is mounted within chamber 35 adjacent to the lower end of tube 30 and extends downwardly through an opening in the bottom of casing 34, and then through a bearing 38 formed centrally of bushing 25 and terminates at a distance below the end of said bushing, its lower end being screwthreaded for a purpose hereafter explained. A coil spring 39 is coiled around the lower end of pin 36 between the lower end of bushing 25 and a retaining pin 40 mounted in the lower end of said pin. Spiders 16 and 19 are provided centrally thereof with bearings 41 and 42 respectively in which bearings are slidably mounted a trigger 43. Trigger 43 is provided at its upper end with a tapered head 44 and has its lower end screw threaded for the reception of the striking disk 45. A coil spring 46 is coiled around the lower end of trigger 44 between disk 45 and the under side of bearing 41 and serves to hold trigger 44 at its lowermost position. In the outer wall of casing 21 are provided a plurality of openings or ports 47 and like ports 48 are provided in the wall of casing 10, and a plurality of ball tubes 49 have their ends secured in these openings, thus connecting the powder chamber to atmosphere. At the innermost end of each tube 49 is mounted in any suitable manner a spider 50 and within tube 49 and on the inner side of said spider are mounted wads 51 and 52, and at the outer end of each of said tubes is mounted a similar wad 53, this end of the tubes being closed by a wad of hard wax or like waterproof material, 54. Within the tubes and held positioned therein by the wads are a plurality of balls or other missiles 55.

Detachably secured to cap 13 to extend upwardly therefrom, and radially of casing 10, are a plurality of steering wings 56, of which I have shown four although any suitable number may be used. When not desired for use a safety cap 57 will be screwed upon the lower screw-threaded end of bushing 25 which prevents trigger 44 engaging the lower end of the firing pin.

In the operation of my torpedo when it is desired to be used the parts will be as shown in Fig. 1, it being understood that the powder chamber is filled with powder or other suitable explosive and the safety cap removed. If it is desired to use the device on the water striking disk 45 will be removed and a similar disk of larger diameter used in lieu thereof.

The torpedo will then be (when the aeroplane is over the desired spot on which it is desired to explode the device) rolled or dropped off the same and the steering wings will cause the torpedo to travel downwardly in a straight line whereby the striking disk will strike the object aimed at and force the trigger 44 upward and cause the same to project the firing pin upwardly and strike the percussion cap and thus explode the explosive within the powder chamber, and the explosive force, following the line of least resistance, will first project the balls or other missiles out through tubes 49 with great velocity and will then shatter the entire structure.

Should it be desired to explode the device close to the ground the extension rods 15 and trigger 44 will be omitted and the striking disk mounted upon the lower end of the firing pin, as best shown in Fig. 2.

Having described my invention what I claim is:

1. An aerial torpedo comprising an outer casing closed at the ends thereof except centrally of the lower end thereof; an inner casing within said outer casing having a closed upper end and a port in its lower end adapted to register with the port in the lower end of the outer casing; a powder chamber within said inner casing; means to hold the ports in the lower end of said casings in register; a plurality of missile tubes extending from said powder chamber to atmosphere; missiles in said tubes; means to cause said torpedo to maintain a vertical longitudinal position during its downward descent; means to explode said powder; and means to operate said exploding means.

2. An aerial torpedo comprising an outer cylindrical casing having a tapered lower end, said lower end having a port in the center thereof; a closure for the upper end of said outer casing; an inner cylindrical casing having a tapered lower end mounted within said outer casing concentric therewith said last lower end having a port therein centrally thereof adapted to register with the port in the tapered end of the outer casing; an explosive chamber in said inner casing; a closure for the upper end of said inner casing; a bushing having a tapered head mounted in the lower end of said inner casing and extending downwardly through the ports in said outer and inner casings; means to detachably secure said bushing in a position of use; a port extending longitudinally through said bushing; a plurality of radially extending missile containers extending from said explosive chamber to the atmosphere; a firing tube mounted within said explosive chamber; a percussion cap on the lower end of said tube; a casing mounted on said firing tube to surround the lower end thereof having a firing chamber therein; a firing pin slidably mounted in said bushing and extending upwardly into said firing chamber and terminating in a tapered head immediately below said firing tube and in alinement therewith, the other end of said firing pin projecting downwardly through said bushing a short distance and terminating in a screwthreaded end; a stop pin extending through said firing pin transversely thereof near its lower end; a spring coiled around said firing pin between the lower end of said bushing and said stop pin; extension arms extending downwardly from the lower end of said outer casing and having their lower ends bent inwardly; a spider having a central bearing mounted on the lower ends of said arms; another spider having a central bearing mounted on said arms intermediate the ends thereof; a trigger slidably mounted in said central bearings the upper end thereof terminating in a head adjacent to the lower end of said firing pin and its other end extending for a distance below the ends of said extension arms and being threaded; a striking disk detachably mounted on the lower end of said trigger; a spring coiled around said trigger between the underside of said spider bearing and said striking disk; explosive material in said explosive chamber; missiles in said missile containers; and means to normally close the ends of said containers whereby said missiles are normally retained within said containers; and steering planes secured to said casing closure.

3. An aerial torpedo comprising an outer casing having a tapered lower end, said lower end having an opening in the center thereof; a closure for the upper end of said casing; an inner casing having a tapered lower end mounted within said outer casing concentric therewith and having an opening in said lower end adapted to register with the opening in the outer casing; an explosive chamber within said inner casing; a closure for the upper end of said inner casing; a bushing having a tapered head mounted in the lower end of said inner casing and extending downwardly through the ports in said outer and inner casings; means to detachably secure said bushing in its position of use; a port extending longitudinally through said bushing; a plurality of radially extending missile containers extending from said explosive chamber to the atmosphere; a firing tube mounted within said explosive chamber; a percussion cap on the lower end of said tube; a casing mounted on said firing tube to surround the lower end thereof having a firing chamber therein; a firing pin slidably mounted in said bushing and extending upwardly into said firing chamber and terminating in a tapered head immediately below the lower end of the firing tube and in alinement therewith, the other end of said firing pin projecting downwardly through said bushing a short distance and having its end screwthreaded; a stop pin extending transversely through said firing pin near the lower end thereof; a spring coiled around said firing pin between the lower end of the bushing and said stop pin; and a striking disk detachably secured upon the lower end of said firing pin; and steering planes secured to the upper end closure of said outer casing.

4. An aerial torpedo comprising an inner and an outer casing having lower tapered ends, said casings being mounted concentrically and being secured together at their lower ends, said inner casing forming an explosive chamber; a plurality of missile containers extending from said explosive chamber, through said outer casing to atmosphere; a closure for the upper ends of each of said casings; steering planes secured to said outer casing; means projecting from the lower end of said casings whereby upon striking an obstruction said explosive is caused to explode.

5. An aerial torpedo comprising an inner and an outer casing having lower tapered ends, said casings being mounted concentrically and being secured together at their lower ends, said inner casing forming an explosive chamber; a plurality of missile containers extending from said explosive chamber to atmosphere; a removable closure for each end of said missile containers; a closure for the upper ends of each of said casings; steering planes secured to the upper end of said outer casing adapted to maintain said casings in a vertical position during its descent; and means projecting from the lower ends of said casings adapted to explode the explosive charge and expel said missiles at a predetermined distance above an obstruction upon striking the same.

In witness that I claim the foregoing I have hereunto subscribed my name this 6th day of June 1917.

FRANK H. PATTON.